United States Patent Office 3,239,491
Patented Mar. 8, 1966

3,239,491
RESIN FOR WET STRENGTH PAPER
Kwan C. Tsou, Abington, and Elizabeth A. Blommers, Huntingdon Valley, Pa., assignors to The Borden Company, New York, N.Y., a corporation of New Jersey
No Drawing. Filed Jan. 26, 1962, Ser. No. 169,095
14 Claims. (Cl. 260—78)

The present invention relates to resin for wet strength paper and to the process of making it.

The invention is an improvement over that described in copending application by Loshaek and Blommers, Serial No. 57,400, filed September 21, 1960, now U.S.P. 3,125,552.

This copending application describes making resin suitable as the binder in wet strength paper, the process being in effect preparing a salt of itaconic acid or like ethenoid acid with a polyamine such as diethylene triamine, converting the salt to an amide still retaining a secondary amine group, and then reacting the product with epichlorohydrin, to effect hydroxy-alkylation of amine group.

While the binder described in this copending application is meritorious for the purpose, we have discovered an improvement which increases the wet strength of paper including the binder by about a third to almost a half over that obtained with hydroxy-alkylated amide of the said application.

Briefly stated, the present invention comprises the process of reacting the selected unsaturated aliphatic acid with ammonia and a polyamine, heating the resulting mixed salt to give amide groups, and reacting the product so produced with an epihalohydrin, said reaction being suitably performed in two stages. In the preferred embodiment, the ammonia is introduced in advance of the polyamine and excess of the polyamine is used over that required theoretically to react with the acid. The invention comprises also the resin and the wet strength paper having the resin distributed as the binder therein.

The effect of reacting the ammonia as well as the amine with the unsaturated acid is shown in tabulated form below, the resins tested as binders being the hydroxy-alkylated amides of itaconic acid, and ammonia and diethylene triamine having been used in that order in making one series of the intermediate salts and the diethylene triamine as the only base in the other series. Dry and wet strengths, in pounds per inch of width of strips, were determined on strips of paper made from wood pulp beater stock. The paper was dried on the paper machine and, alternatively, in an oven. The dry tensile strength (DT), the wet tensile strength (WT) and the ratio WT/DT are recorded for papers made with the resin introduced into the paper beater in the proportions of ¼%, ½% and 1%, in three separate series of tests, on the dry weight of the fibers.

The ratio of the wet strength to the dry strength is larger in each of the twelve comparable pairs of tests when the ammonia had been used.

Laboratory tests were made in which filter paper strips were dipped in suspensions of the binders of concentrations 0.05% and 0.5%, dried, cured for 1 hour at 105° C., then tested both dry and after redipping in water. When the binder in the paper had been made with the initial use of the ammonia and then the diethylene triamine (DETA), the paper was stronger than when the DETA had been used as the sole base. The increase in strength was in the ratio of 1.58:1 for the resin used at 0.05% concentration and 1.22:1 for 0.5% concentration.

More specifically the resin made without the use of ammonia and compared in tests above was made according to Example 1 of the said copending application. DETA (1.09 moles) was reacted with itaconic acid (0.99 moles), the product heated eventually to 160°–165° C., to convert the amine salt first formed to the amide (retaining still a secondary amine group), cooled, formed into an aqueous solution at 23° C. and then reacted with 0.9 mole of epichlorohydrin for 1 equivalent of secondary amine group —NH—. The whole was heated to 80°–85° C. until the reaction was substantially complete and hydrochloric acid then admixed in amount to lower the pH to 4.6.

Our new resin prepared with the addition of ammonia and used in the above tests was made as described in Example 1 later herein.

MATERIALS AND PROPORTIONS

The acid used is an alpha-beta unsaturated di- or other polycarboxylic acid when it is to be homopolymerized or copolymerized with an ethenoid comonomer. Examples that illustrate the class of acids that we use are the $C_2$–$C_{10}$ ethenoid acids such as itaconic, fumaric, maleic, citraconic, and mesaconic acids. In addition to the aliphatic unsaturated acids, we may use aromatic polycarboxylic acids as, for example, terephthalic or isophthalic, trimesic, or diphenic acid in the amount of 5–70 moles for 100 total moles of the mixed unsaturated and aromatic acids.

When we use the polyamine in excess of the polycarboxylic acid and also a two stage epoxidation, we may substitute the unsaturated by a saturated acid, e.g., by sebacic, adipic, suberic or other di- or tricarboxylic acid having 4–10 carbon atoms to the molecule.

The polyamine which is reacted with the ethenoid aliphatic acid, to make the amide, is any one of the water soluble aliphatic polyamines having 3–16 carbon atoms, at least 2 primary amine groups and at least 1 secondary amine group to the molecule. Examples of amines that illustrate the class that we can use are diethylenetriamine, triethylenetetramine, tetraethylenepentamine, and the homologous amines in which the ethylene group is re-

| Epoxidized Amide Resin Made With | Drying of Paper | Proportion of Resin in Paper | | | | | | | | |
|---|---|---|---|---|---|---|---|---|---|---|
| | | ¼% of Resin | | | ½% of Resin | | | 1% of Resin | | |
| | | DT | WT | WT/DT, Percent | DT | WT | WT/DT, Percent | DT | WT | WT/DT, Percent |
| No NH₃ | Machine | 21.3 | 1.5 | 7.0 | 21.8 | 2.0 | 9.1 | 25.1 | 2.5 | 9.9 |
| No NH₃ | Oven | 21.0 | 3.9 | 18.5 | 26.6 | 5.6 | 21.1 | 27.4 | 6.8 | 24.8 |
| NH₃ | Machine | 22.1 | 2.5 | 11.3 | 23.9 | 3.9 | 16.3 | 22.7 | 4.1 | 18.1 |
| NH₃ | Oven | 25.3 | 6.7 | 26.5 | 24.1 | 7.7 | 31.9 | 26.0 | 9.0 | 34.6 | placed by propylene, butaylene or any $C_3$–$C_4$ alkylene group.

As the halohydrin we use ordinarily epichlorohydrin. It is effective and available at a satisfactory price. We may use any other water soluble or otherwise water dispersible chlorohydrin having in its structure the oxirane group. We may use also the corresponding bromo- and iodohydrins although there is no advantage now known in their use which offsets the disadvantage of their additional cost.

Examples of the initiators that we may use to polymerize the reaction product of epichlorohydrin with polyamides are hydrogen peroxide, potassium persulfate, sodium perborate, tertiary-butyl hydroperoxide, azobisisobutyronitrile, and the combination of any one or more of them with each other or with a reducing agent in the so called redox system of initiators. Suitable reducing agents to be used in the redox system are ascorbic acid, sodium metabisulfite, and a ferrous salt such as ferrous chloride or sulfate, suitably in equal amounts by weight of the oxidizing and the reducing agent. These agents are all water soluble and are adapted for emulsion polymerization of the ethenoid materials.

Also there may be used a cationic or nonionic emulsifying agent, as, for example, benzyl trimethyl ammonium chloride, polyvinyl alcohol, methyl cellulose, and glycerine, pentaerythritol, and diethylene glycol monoesters of lauric, palmitic, oleic, and stearic acids.

The following table shows proportions of the several components in our synthesis that (1) are operative or permissible and (2) those that are recommended for commercial use.

| Reactant | For 1 Mole of the Unsaturated Acid Used | |
|---|---|---|
| | Permissible | Recommended |
| Alkylene polyamine, moles | 1–1.6 | 1.1–1.3 |
| Ammonia, moles | 1–5 | 2–4 |
| Halohydrin, moles | 0.4–3.5 | 1–3 |
| Reducing agent, g. per g. mole of the acid | 0–5 | 0.2–2 |

The permissible proportions of the reducing agent, when used is ordinarily about 0.2–2 parts by weight for 100 parts by weight of the unsaturated acid used in making the amide, the weight of the reducing agent being somewhat higher within the range for those agents which, for a given weight, have relatively low reducing capacity.

The initiator, when used, is in conventional proportion, e.g., 0.1%–2% of the total weight of monomers.

The acid is for best results in proportion to react, i.e., form an amine salt with at least 1–1.5 but less than all primary groups of the polyamine used and to leave unreacted at this stage at least 1 secondary amine group per mole of the amine.

The ammonia when used is in the amount of about 0.5–5 moles for 1 equivalent weight of the unsaturated acid, e.g., for 0.5 mole of a dicarboxylic acid such as itaconic. Ordinarily we use about 3 to 4 moles of the ammonia for 1 equivalent of the acid. The initial excess is considered to accelerate the reaction. Any excess of ammonia remaining unreacted is eventually expelled from the system.

OPERATING CONDITIONS

The conditions under which the resin is made and then used in the paper are as described in the copending application except for the introduction of the ammonia at the start of the reaction with the amine.

The ammonia in aqueous solution, e.g., of concentration about 28%, is added gradually and with stirring to the selected ethenoid acid in aqueous solution of suspension. The exothermic reaction that ensues is controlled if necessary by cooling to keep the temperature below the boiling point of the mixture. Then the whole is heated to drive off at least most of the excess of ammonia.

The selected polyamine such as diethylene triamine is introduced in amount about equivalent to that of the acid. After the reaction is completed the whole is again warmed to a temperature increasing gradually to about 100° C., held there for about 10 minutes, and then heated to a higher temperature at which any ammonium salt and the amine salt present will be decomposed to the amide, as to about 160°–165° for about ½ to 1 hour. The remaining composition is then heated in vacuo until substantially all the water is removed.

Epichlorohydrin is added to a preformed aqueous solution of the said amide and the whole then heated to cause epoxidation. The reaction and the heating are continued until the viscosity reaches the desired level as, for instance, to incipient gelation followed by dilution to a solids content of 10%.

In an embodiment that gives a resin of particularly high wet strength, we effect the epoxidation in two stages. We admix approximately 0.3–0.6 mole of the epichlorohydrin into an aqueous solution representing 1 mole of itaconic or other polycarboxylic acid used in making the amide. Then we warm this until there is a substantial increase in viscosity, as to a stage not beyond incipient gelation. Next we dilute by adding more water to the resulting solution, admix the rest of the epichlorohydrin, and warm again to complete the reaction that ensues, as will be shown by the pH becoming acidic. In a representative 2-stage reaction, the epichlorohydrin used was about 1 mole, actually 1.1 moles, half of it was added at the start, the solution was warmed at 70°–75° C. to the pregel stage, the remainder of the epichlorohydrin admixed and the warming resumed until the pH dropped to an acidic value below 7 and the solution again reached a pregel stage.

The invention will be further illustrated by description in connection with the following examples or the practice of it, proportions being expressed here and elsewhere herein as parts by weight except where stated specifically to the contrary.

*Example 1*

One mole of itaconic acid (120 parts) was dispersed by being swirled briefly in 75 parts of cold water and the mixture filtered to remove soluble impurities. The moist itaconic acid remaining on the filter was mixed with 243 parts of concentrated commercial ammonium hydroxide solution (4 moles). The resulting solution was stored overnight in a closed vessel at room temperature. Then there were admixed 103.0 parts of diethylene triamine (1 mole DETA) and 6.0 parts of decolorizing carbon (Nuchar). The solution was warmed carefully for 10 minutes at 100° C. and then filtered. The filtrate, containing the mixed ammonium and DETA itaconates in solution and in decolorized condition, was then evaporated to dryness. The residue from the evaporation was then heated to about 160°–165° for 3 hours to drive off approximately 2 moles of water for each mole of the itaconic acid used, this loss of water corresponding to the conversion of one equivalent weight of ammonium or amine salt to the corresponding amide, thus

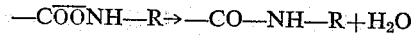

The amide was dissolved in water to a solids concentration corresponding to about 50%. The pH was 9.65.

The amide solution made as described above was then epoxidized as follows: To 165 parts of the polyamide solution (representing about 0.4 mole of itaconic acid used originally) there were added 97.4 parts of additional water. The resulting solution was heated to 50° C. At this point 22.2 parts of epichlorohydrin (about 0.24 mole) were introduced over a period of 10 minutes. The whole was next heated to 75°–80° C. for 10 minutes more, at the end of which time a slight increase of viscosity was observed and the pH was about 8.5. Then 387.8 parts of water were added to dilute the solution to the concentration of 12% of solids based on polyamide. The solution was again heated to 50° C. and the remaining half of the epichlorohydrin (22.2 parts addition) mixed over a 12 minute period. The solution was then again heated to 75°–80° C. for 30 minutes and then up to 83° C. for about 5 minutes. Reaction occurs as the heating is continued and the solution reaches a high viscosity, above Z (Gardner-Holdt scale). When the pH had fallen below 7, 532 parts of water were added, to dilute the whole to a concentration of about 10% solids. The pH (6.72) was then lowered to 3.5 by the addition of the proper amount of 6 N hydrochloric acid.

This material was used as the binder made "with NH₃" in paper for the tests tabulated earlier herein.

Example 2

The procedure and composition of Example 1 are used except that the ammonium itaconate

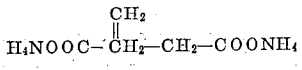

is prepared in advance. It is the material that is then mixed with the diethylene triamine and processed from that point forward as described in Example 1.

Example 3

The procedure and composition of Example 1 are followed except that the amide of itaconic acid and ammonium hydroxide,

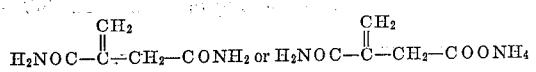

is prepared in advance. It is then mixed with 2 moles of diethylene triamine for each mole of the amide, 100% excess, and the whole then heated as described, first to evaporate water and second to convert the salt to the amide, as to the temperature of about 160°–165° C. for 3 hours.

Example 4

The procedure and composition of Example 1 are used except that the ammonia and the DETA are mixed together and added jointly and slowly to the itaconic acid solution. They are thus reacted at the time with the said acid.

Example 5

The procedure and composition of Example 1 are followed except that the itaconic acid there used is replaced by an equimolar weight of fumaric, maleic, citraconic, and mesaconic acids, used separately and in turn.

Example 6

The procedure and composition of Example 1 are used except that the diethylene triamine is replaced by an equivalent weight of triethylenetetramine, tetraethylenepentamine, and the homologous amines in which the ethylene group is replaced by propylene, butylene, or any $C_3$–$C_4$ alkylene group used separately and in turn.

Example 7

The product of the last heating in Example 1, i.e., the epoxidized amide is mixed with an initiator of ethenoid bond polymerization, e.g., hydrogen peroxide, potassium persulfate, sodium perborate, tertiary-butyl hydroperoxide, azobisisobutyronitrile or redox system, each initiator being used separately, in turn, and in the total amount of 0.5% of the weight of the epoxidized amide.

Example 8

The procedure and composition of Example 1 are used except that 1 mole of adipic acid is substituted for the itaconic acid and the amount of the diethylene triamine is 1.5 moles.

Example 9

The procedure and composition of Example 1 are used except that 1 mole of any of the other $C_4$–$C_{10}$ saturated dicarboxylic aliphatic acids shown herein is substituted for the itaconic acid and the amount of the diethylene triamine is 1.5 moles.

The hydroxy-alkylated amides made as described in the examples above are effective as wet strength resins.

Example 10

The epichlorohydrin-reacted amide representing the final product of Example 1 is dispersed in a paper beater charge of beaten sulfite wood pulp in the proportion of 0.2 part of the resin mixture for 100 parts of the wood fibers.

The beater mixture is then formed into a paper on a Fourdrinier wire and the paper dried and then held at 105° C. for 10 minutes to thermoset the epoxidized amide.

Tests on paper made in this manner appear earlier herein and show the satisfactory wet strength properties of the resin.

It will be understood that it is intended to cover all changes and modifications of the examples of the invention herein chosen for the purpose of illustration which do not constitute departures from the spirit and scope of the invention.

We claim:
1. The process of making a resin which comprises the steps of:
    (1) reacting (a) a water dispersion of 1 mol of a $C_2$–$C_{10}$ alpha-unsaturated polycarboxylic acid, (b) 1–5 mols of ammonia and, (c) about 1.1–1.6 mols of a water-soluble alkylene polyamine having 3–16 carbon atoms and at least 1 secondary and 2 primary amine groups to the molecule;
    (2) continuing the reaction until salt formation is substantially complete;
    (3) evaporating said water from the reaction;
    (4) heating said reaction to temperatures at which said salt undergoes pyrolytic decomposition to amide;
    (5) cooling and dissolving said amide in water;
    (6) mixing into the solution of dissolved amide, a water dispersable epihalohydrin containing approximately 3 carbon atoms in proportion of between about 4–3.5 mols, and;
    (7) warming the mixture so made until the pH of said mixture falls below 7.
2. The process of claim 1 in which the said alpha-unsaturated acid is itaconic.
3. The process of claim 2, the ammonia being introduced into the said dispersion and caused to react with the itaconic acid before the alkylene polyamine is introduced.
4. The process of claim 2, the amount of ammonia being at least approximately equivalent to the itaconic acid used.
5. The process of claim 1 in which the said polyamine is diethylene triamine.
6. The process of claim 3 in which the said acid is selected from the group consisting of itaconic, fumaric, maleic, citraconic, and mesaconic acids.
7. The process of claim 1 in which:
    (1) the epihalohydrin is epichlorohydrin, and
    (2) the warming of the amide mixture with the epichlorohydrin is effected in two stages, (a) the amount of the epichlorohydrin introduced in the first stage being not more than about .7 mol and the warming being continued until the viscosity of the mixture is increased, the maximum viscosity being the incipient gelation point of said mixture, the mixture then being diluted by adding at least sufficient proportions of water to make said mixture fluid, (b) the remainder of the epichlorohydrin being then admixed and the diluted mixture being again warmed until the ensuing reaction is complete.

8. The process of claim 7, the total epichlorohydrin used being about 1 mole and the amount introduced in the said first stage being about 0.5 mole.

9. A resin suitable for use as a binder in wet strength paper, the said resin being an hydroxy-alkylated amide and being the final product of the process of claim 1.

10. A wet strength paper comprising matted paper forming fibers and the hydroxy-alkylated amide that is the thermoset final product of the process of claim 7 dispersed in the fibers in the proportion of about 0.05%–1% of the weight of the said fibers.

11. The process of making a resin which comprises forming an aqueous dispersion of 1 mole of a $C_2$–$C_{10}$ aliphatic polycarboxylic acid, 1–5 moles of ammonia and about 1.1–1.6 moles of a water soluble alkylene polyamine having 3–16 carbon atoms and at least 1 secondary and 2 primary amine groups to the molecule, continuing the reaction that occurs until salt formation is substantially complete, heating the resulting dispersion and said salt until the water is evaporated from the dispersion and then to a higher temperature at which the salt undergoes pyrolytic decomposition to amide, cooling and dissolving the resulting amide in water, mixing into the solution of dissolved amide approximately 0.3–0.6 mole of epichlorohydrin, warming the mixture so made until the pH falls and then becomes practically constant, then introducing additional epichlorohydrin in amount to make the total at least 50% more than the amount thereof first introduced, and again warming the resulting solution until the pH falls and then becomes practically constant.

12. The process of claim 11, the said acid being adipic.

13. The process of making a resin which comprises the steps of:
(1) reacting (a) a water dispersion of 1 mole of mixed polycarboxylic acids, said acids inculding $C_2$–$C_{10}$ alpha-unsaturated polycarboxylic acids and aromatic polycarboxylic acids in proportion of 5–70 moles of said aromatic polycarboxylic acids for 100 total moles of said mixed alpha-unsaturated acids and aromatic polycarboxylic acids, (b) 1–5 moles of ammonia and, (c) about 1.1–1.6 moles of a water-soluble alkylene polyamine having 3–16 carbon atoms and at least 1 secondary and 2 primary amine groups to the molecule;
(2) continuing the reaction until salt formation is substantially complete;
(3) evaporating said water from the reaction;
(4) heating said reaction to temperatures at which said salt undergoes pyrolytic decomposition to amide;
(5) cooling and dissolving said amide in water;
(6) mixing into the solution of dissolved amide, a water dispersable epihalohydrin containing approximately 3 carbon atoms in proportion of between about 4–3.5 moles, and;
(7) warming the mixture so made until the pH of said mixture falls below 7.

14. The process of claim 13, said aromatic polycarboxylic acids being selected from the group consisting of terephthalic acid, isophthalic acid, trimesic acid and diphenic acid.

References Cited by the Examiner
UNITED STATES PATENTS

| | | | |
|---|---|---|---|
| 2,926,154 | 2/1960 | Keim | 260—78 |
| 2,961,347 | 11/1960 | Floyd | 260—78 |
| 2,998,295 | 8/1961 | Goldann | 260—78 |
| 3,019,156 | 1/1962 | Lundberg et al. | 260—78 |

WILLIAM H. SHORT, *Primary Examiner.*

LOUISE P. QUAST, *Examiner.*